(12) United States Patent
Verrilli et al.

(10) Patent No.: US 11,140,443 B2
(45) Date of Patent: *Oct. 5, 2021

(54) IDENTIFICATION AND PRESENTATION OF CONTENT ASSOCIATED WITH CURRENTLY PLAYING TELEVISION PROGRAMS

(71) Applicant: GOOGLE LLC, Mountain View, CA (US)

(72) Inventors: Michael Verrilli, New York, NY (US); Nathan Leslie Sandland, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,592

(22) Filed: Jun. 25, 2020

(65) Prior Publication Data
US 2020/0329275 A1    Oct. 15, 2020

Related U.S. Application Data

(63) Continuation of application No. 16/276,379, filed on Feb. 14, 2019, now Pat. No. 10,701,440, which is a (Continued)

(51) Int. Cl.
*G04F 3/00* (2006.01)
*G06F 13/00* (2006.01)
(Continued)

(52) U.S. Cl.
CPC ..... *H04N 21/44204* (2013.01); *G06F 40/211* (2020.01); *H04N 21/4782* (2013.01); *H04N 21/4828* (2013.01); *H04N 21/8153* (2013.01)

(58) Field of Classification Search
CPC ......... H04N 21/44204; H04N 21/4782; H04N 21/4828; H04N 21/8153; G06F 40/211
See application file for complete search history.

(56) References Cited

U.S. PATENT DOCUMENTS

| 5,355,162 A | 10/1994 | Yazolino et al. |
| 6,104,334 A | 8/2000 | Allport et al. |

(Continued)

FOREIGN PATENT DOCUMENTS

| CN | 101309353 | 11/2008 |
| CN | 101388142 | 3/2009 |

(Continued)

OTHER PUBLICATIONS

Examination Report dated Mar. 3, 2020 in in Patent Application No. 201647032681.

(Continued)

*Primary Examiner* — Kyu Chae
(74) *Attorney, Agent, or Firm* — Byrne Poh LLP

(57) ABSTRACT

Features of various implementations are used to enable identifying and presenting, in real time, Internet-accessible and/or Internet-based functionality, content and/or services associated with a particular television program concurrently playing on a television or display, as a part of an interactive television suite of technologies. In some implementations, the process of identifying Internet-accessible and/or Internet-based functionality, content and/or services associated with a particular television program is enabled to reduce communication between a primary set-top box and a supplemental set-top box and/or television integrated device, thereby reducing the need for one or more provider specific APIs. For example, one aspect of the disclosure is a computer-implemented method of identifying a media program by capturing display data from the media program, and extracting information from the display data in response to determining that the display data includes a program information overlay associated with the media program.

19 Claims, 11 Drawing Sheets

Related U.S. Application Data continuation of application No. 15/727,394, filed on Oct. 6, 2017, now Pat. No. 10,237,612, which is a continuation of application No. 13/831,166, filed on Mar. 14, 2013, now Pat. No. 9,788,055, which is a continuation-in-part of application No. 13/623,043, filed on Sep. 19, 2012, now Pat. No. 10,735,792.

(51) Int. Cl.
| | |
|---|---|
| *H04N 5/445* | (2011.01) |
| *H04N 21/442* | (2011.01) |
| *H04N 21/4782* | (2011.01) |
| *H04N 21/482* | (2011.01) |
| *H04N 21/81* | (2011.01) |
| *G06F 40/211* | (2020.01) |

(56) References Cited

U.S. PATENT DOCUMENTS

| | | |
|---|---|---|
| 6,597,374 B1 | 7/2003 | Baker et al. |
| 6,658,662 B1 | 12/2003 | Nielsen |
| 6,690,392 B1 | 2/2004 | Wugoski |
| 6,742,183 B1 | 5/2004 | Reynolds et al. |
| 7,031,553 B2 | 4/2006 | Myers et al. |
| 7,113,230 B1 | 9/2006 | Genovese et al. |
| 7,134,131 B1 | 11/2006 | Hendricks et al. |
| 7,620,268 B2 | 11/2009 | Myers et al. |
| 7,664,317 B1 | 2/2010 | Sowerby |
| 7,787,705 B2 | 8/2010 | Sun et al. |
| 7,814,524 B2 | 10/2010 | Candelore |
| 7,991,801 B2 | 8/2011 | Chen et al. |
| 8,006,268 B2 | 8/2011 | Sloo |
| 8,077,263 B2 | 12/2011 | Candelore |
| 9,113,202 B1 | 8/2015 | Wiseman et al. |
| 9,788,055 B2 * | 10/2017 | Verrilli .............. H04N 21/4828 |
| 9,832,413 B2 | 11/2017 | Sandland et al. |
| 9,866,899 B2 | 1/2018 | Dureau et al. |
| 9,948,972 B2 | 4/2018 | Moon et al. |
| 10,194,201 B2 | 1/2019 | Dureau et al. |
| 10,237,612 B2 * | 3/2019 | Verrilli ................. G06F 40/211 |
| 10,701,440 B2 * | 6/2020 | Verrilli ............. H04N 21/44204 |
| 2002/0042920 A1 * | 4/2002 | Thomas .............. H04N 21/235 725/87 |
| 2003/0004914 A1 | 1/2003 | McGreevy |
| 2004/0075692 A1 | 4/2004 | Matichuk |
| 2004/0183947 A1 | 9/2004 | Lee |
| 2004/0199502 A1 | 10/2004 | Wong et al. |
| 2004/0201720 A1 | 10/2004 | Robins et al. |
| 2004/0239809 A1 | 12/2004 | Kim et al. |
| 2004/0260621 A1 | 12/2004 | Foster et al. |
| 2005/0020238 A1 | 1/2005 | Eastman et al. |
| 2005/0123200 A1 | 6/2005 | Myers et al. |
| 2005/0177847 A1 | 8/2005 | Konig et al. |
| 2005/0251823 A1 * | 11/2005 | Saarikivi ................ H04H 20/28 725/42 |
| 2006/0026128 A1 | 2/2006 | Bier |
| 2006/0265731 A1 | 11/2006 | Matsuda |
| 2007/0073704 A1 | 3/2007 | Bowden et al. |
| 2007/0186228 A1 | 8/2007 | Ramaswamy et al. |
| 2007/0192910 A1 | 8/2007 | Vu et al. |
| 2008/0028424 A1 | 1/2008 | Cho |
| 2008/0095433 A1 | 4/2008 | Johnson et al. |
| 2008/0097984 A1 | 4/2008 | Candelore |
| 2008/0098432 A1 | 4/2008 | Hardacker et al. |
| 2008/0098433 A1 | 4/2008 | Hardacker et al. |
| 2008/0127253 A1 | 5/2008 | Zhang et al. |
| 2008/0143880 A1 | 6/2008 | Jung et al. |
| 2008/0146277 A1 | 6/2008 | Anglin et al. |
| 2008/0226119 A1 | 9/2008 | Candelore et al. |
| 2008/0244637 A1 | 10/2008 | Candelore |
| 2008/0273114 A1 | 11/2008 | Hardacker et al. |
| 2008/0279453 A1 | 11/2008 | Candelore |
| 2009/0077049 A1 | 3/2009 | Seet et al. |
| 2009/0077065 A1 * | 3/2009 | Song .................. G06F 16/3326 |
| 2009/0083801 A1 | 3/2009 | Hardacker et al. |
| 2009/0205000 A1 | 8/2009 | Christensen et al. |
| 2009/0320070 A1 | 12/2009 | Inoguchi |
| 2009/0328237 A1 | 12/2009 | Rodriguez et al. |
| 2010/0008266 A1 | 1/2010 | Reda et al. |
| 2010/0037264 A1 | 2/2010 | Hardacker et al. |
| 2010/0123735 A1 | 5/2010 | Blanchard et al. |
| 2010/0153831 A1 * | 6/2010 | Beaton ............... G06Q 30/0603 715/201 |
| 2010/0165207 A1 | 7/2010 | Deng et al. |
| 2010/0192178 A1 | 7/2010 | Candelore |
| 2010/0225830 A1 | 9/2010 | Blanchard et al. |
| 2010/0253533 A1 | 10/2010 | Lee et al. |
| 2010/0293162 A1 * | 11/2010 | Odland ............... G06F 16/3322 707/736 |
| 2010/0293195 A1 * | 11/2010 | Houghton ............. G06F 16/285 707/776 |
| 2010/0296007 A1 | 11/2010 | Cooper |
| 2011/0025842 A1 | 2/2011 | King et al. |
| 2011/0030016 A1 | 2/2011 | Pino et al. |
| 2011/0081948 A1 | 4/2011 | Shirai et al. |
| 2011/0202848 A1 * | 8/2011 | Ismalon ................ G06F 16/958 715/738 |
| 2011/0247044 A1 | 10/2011 | Jacoby |
| 2011/0282906 A1 * | 11/2011 | Wong .................. G06F 16/7867 707/780 |
| 2011/0289532 A1 | 11/2011 | Yu et al. |
| 2011/0296463 A1 * | 12/2011 | Suslov .................. H04N 7/173 725/44 |
| 2011/0311095 A1 | 12/2011 | Archer |
| 2012/0079534 A1 | 3/2012 | Huang |
| 2012/0143595 A1 | 6/2012 | Li et al. |
| 2012/0210233 A1 | 8/2012 | Davis et al. |
| 2013/0041921 A1 | 2/2013 | Cooper et al. |
| 2013/0101002 A1 | 4/2013 | Gettings et al. |
| 2013/0114849 A1 | 5/2013 | Pengelly et al. |
| 2013/0120590 A1 | 5/2013 | Clark |
| 2013/0276029 A1 | 10/2013 | Li et al. |

FOREIGN PATENT DOCUMENTS

| | | |
|---|---|---|
| CN | 102369724 | 3/2012 |
| CN | 104219548 | 12/2014 |
| EP | 0246410 | 8/1988 |
| EP | 2464103 | 4/2014 |
| KR | 20110040882 | 4/2011 |

OTHER PUBLICATIONS

Examination Report dated Mar. 24, 2020 in EP Patent Application No. 15710665.9.
International Search Report and Written Opinion dated Mar. 19, 2014 in International Patent Application No. PCT/US2013/060697.
International Search Report and Written Opinion dated Jul. 6, 2015 in International Patent Application No. PCT/US2015/017999.
Notice of Allowance dated Jan. 6, 2021 in U.S. Appl. No. 16/257,013.
Notice of Allowance dated Mar. 11, 2020 in U.S. Appl. No. 13/623,043.
Notice of Allowance dated Mar. 31, 2020 in U.S. Appl. No. 16/276,379.
Notice of Allowance dated Jun. 1, 2017 in U.S. Appl. No. 13/831,166.
Notice of Allowance dated Sep. 12, 2018 in U.S. Appl. No. 15/835,350.
Notice of Allowance dated Oct. 5, 2017 in U.S. Appl. No. 14/194,551.
Notice of Allowance dated Oct. 29, 2018 in U.S. Appl. No. 15/727,394.
Notice of Allowance dated Nov. 2, 2020 in KR Patent Application No. 10-2020-7006321.
Office Action dated Jan. 10, 2020 in U.S. Appl. No. 16/257,013.
Office Action dated Jan. 10, 2020 in U.S. Appl. No. 16/276,379.
Office Action dated Jan. 14, 2014 in U.S. Appl. No. 13/623,043.
Office Action dated Feb. 28, 2014 in U.S. Appl. No. No. 13/831,166.
Office Action dated Feb. 28, 2017 in U.S. Appl. No. 13/623,043.
Office Action dated Mar. 25, 2016 in U.S. Appl. No. 13/831,166.
Office Action dated Apr. 3, 2020 in CN Patent Application No. 201811633924.X.

(56) References Cited

OTHER PUBLICATIONS

Office Action dated Apr. 10, 2015 in U.S. Appl. No. 14/194,551.
Office Action dated Apr. 25, 2018 in U.S. Appl. No. 15/835,350.
Office Action dated May 5, 2017 in U.S. Appl. No. 14/194,551.
Office Action dated May 25, 2020 in KR Patent Application No. 10-2020-7006321.
Office Action dated Jun. 2, 2015 in U.S. Appl. No. 13/623,043.
Office Action dated Jun. 10, 2013 in U.S. Appl. No. 13/623,043.
Office Action dated Jun. 29, 2017 in CN Patent Application No. 201380058308.5.
Office Action dated Aug. 7, 2019 in KR Patent Application No. 10-2019-7019490.
Office Action dated Aug. 12, 2016 in U.S. Appl. No. 13/623,043.
Office Action dated Aug. 16, 2018 in U.S. Appl. No. 15/727,394.
Office Action dated Sep. 12, 2014 in U.S. Appl. No. 13/831,166.
Office Action dated Sep. 25, 2017 in U.S. Appl. No. 13/623,043.
Office Action dated Sep. 30, 2016 in U.S. Appl. No. 14/194,551.
Office Action dated Oct. 7, 2015 in U.S. Appl. No. 13/831,166.
Office Action dated Oct. 8, 2015 in U.S. Appl. No. 13/623,043.
Office Action dated Nov. 2, 2018 in CN Patent Application No. 201580019008.5.
Office Action dated Nov. 20, 2015 in U.S. Appl. No. 14/194,551.
Office Action dated Nov. 20, 2020 in U.S. Appl. No. 16/257,013.
Office Action dated Nov. 24, 2020 in CN Patent Application No. 2019010521231.X.
Office Action dated Dec. 2, 2020 in CN Patent Application No. 201910521244.7.
Office Action dated Dec. 4, 2018 in KR Patent Application No. 10-2015-7010122.
Office Action dated Dec. 7, 2016 in U.S. Appl. No. 13/831,166.
Office Action dated Jun. 16, 2021 in CN Patent Application No. 201910521231.X.
Summons to Attend Oral Proceedings dated Jun. 8, 2021 in EP Patent Application No. 15710665.9.

* cited by examiner

IDENTIFICATION AND PRESENTATION OF CONTENT ASSOCIATED WITH CURRENTLY PLAYING TELEVISION PROGRAMS

RELATED APPLICATIONS

This application is a continuation of U.S. patent application Ser. No. 16/276,379, entitled "Identification and Presentation of Content Associated with Currently Playing Television Programs," filed on Feb. 14, 2019, now U.S. Pat. No. 10,701,440, issued on Jun. 30, 2020, which is a continuation of U.S. patent application Ser. No. 15/727,394, entitled "Identification and Presentation of Internet-Accessible Content Associated with Currently Playing Television Programs," filed on Oct. 6, 2017, now U.S. Pat. No. 10,237,612, issued on Mar. 19, 2019, which is a continuation of U.S. patent application Ser. No. 13/831,166, entitled "Identification and Presentation of Internet-Accessible Content Associated with Currently Playing Television Programs," filed on Mar. 14, 2013, now U.S. Pat. No. 9,788,055, issued on Oct. 10, 2017, which is a continuation-in-part of U.S. patent application Ser. No. 13/623,043, entitled "Using OCR to Detect Currently Playing Television Programs", filed on Sep. 19, 2012, each of which is incorporated by reference herein in its entirety.

TECHNICAL FIELD

The disclosed implementations relate to systems, methods and devices configured to collect and present Internet-accessible content associated with playing television programs.

BACKGROUND

Interactive television technologies generally enable adding Internet-accessible functionality, content and/or services as an overlay to the television signals provided by cable and satellite television providers. For example, one of the aims of interactive television technologies is to deliver Internet-accessible functionality, content and/or services to an individual consumer that are matched to a particular television program the consumer is currently watching. To that end, interactive television technologies often need to determine what each consumer is watching in order to deliver matched functionality, content and/or services.

According to previously developed systems and methods, a second device, such as a supplemental set-top box, is configured to work with the primary set-top box provided by the cable or satellite television provider. In order to determine what a consumer is watching, the supplemental set-top box sends a query to the primary set-top box requesting information about the currently playing television program selected by the consumer (e.g. the title, names of actors or characters, electronic program guide information, etc.). In order to send such a query or otherwise communicate with the primary set-top box, the supplemental set-top box usually includes one or more provider-specific application program interfaces (APIs) that enable the supplemental set-top box to be paired with a wide variety of primary set-top boxes from various cable and satellite television providers. The development of each API requires the input and cooperation of a respective cable or satellite television provider that provides a primary set-top box to consumers. Developing the APIs with various providers tends to be inefficient, and hinders scaling such technologies across a wide variety of provider-specific platforms.

SUMMARY

Various implementations of systems, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description" one will understand how the features of various implementations are used to enable identifying and presenting, in real time, Internet-accessible and/or Internet-based functionality, content and/or services associated with a particular television program concurrently playing on a television or display.

One aspect of the disclosure is a computer-implemented method of identifying a media program by capturing display data from the media program as it is being presented; evaluating the display data to determine whether or not the display data includes a text overlay including information about the media program; and extracting text from the overlay in response to determining that the display data includes the text overlay, wherein the extracted text is associated with the media program.

Another aspect of the disclosure is a computer program product enabling identification of a playing broadcast media program by a device including a processor and a memory. In some implementations, the computer program product including instructions, storable in a non-transitory memory and executable by a processor, that, when executed by a processor, cause a device to capture display data provided by a set-top box; evaluate the display data to determine whether or not the display data includes a text overlay including information about the playing broadcast media program; and, extract text in response to determining that the display data includes said text overlay, wherein the extracted text identifies the playing broadcast media program.

Another aspect of the disclosure is a computer-implemented method of identifying and presenting content associated with a media program at an electronic device configured to receive the media program, the electronic device including a processor and memory. In some implementations, the method includes capturing display data associated with the media program; extracting text from the display data, wherein the extracted text is associated with the media program; generating search terms from the extracted text; performing an Internet search based on at least some of the generated search terms to identify content associated with; and displaying the results of the search.

In some implementations, the method further comprises evaluating the display data to determine whether or not the display data includes a text overlay including information about the media program, and wherein text is extracted from the display data in response to determining that the display data includes the text overlay.

In some implementations, capturing the display data includes performing a screen capture from a display device configured to display the media program. In some implementations, capturing the display data includes decoding data transmitted by the electronic device to the display device.

In some implementations, the method further comprises comparing the extracted text to electronic program guide data to confirm identification of the playing broadcast media program.

In some implementations, the method further comprises: transmitting a code to the set-top box to initiate the display of the text overlay; and transmitting a code to the set-top box to end the display of the text overlay is response to capturing the display data. In some implementations, the code is an infrared code.

In some implementations, the method further comprises detecting a transmission directed at the set-top box; determining whether the transmission includes a code that generally causes the set-top box to provide the text overlay in the display data, and wherein capturing the display data occurs in response to determining that the transmission includes a code that generally causes the set-top box to provide the text overlay in the display data. In some implementations, the code is an infrared code.

In some implementations, extracting text from the display data comprises applying an optical character recognition process to the captured display data. In some implementations, generating search terms comprises: identifying noun phrases in the extracted text; and selecting a threshold number of the noun phrases to be search terms.

In some implementations, identifying noun phrases comprises: removing program showing data from the extracted text to produce one or more descriptive phrases; and removing at least one verb from the one or more descriptive phrases to produce one or more noun phrases.

In some implementations, identifying noun phrases comprises comparing segments of the one or more descriptive phrases to known names of television shows, movies, sporting events and known proper names.

In some implementations, the method further comprises refining each of the selected threshold number of search terms by at least one of: checking and correcting for typographical errors; cross-referencing against known names of television shows, movies, sporting events and known proper names; and cross-referencing against prior search data.

In some implementations, performing the Internet search comprises performing a respective Internet search for each of the threshold number of noun phrases, and wherein each respective Internet search produces corresponding search results.

In some implementations, the method further comprises scoring the search results; and displaying at least some of the search results based on the scoring. In some implementations, the scoring comprises: categorizing the search results; assigning a query score based on at least one of location data, search history and user preferences; assigning a proximity score to each of the threshold number of the noun phrases selected as search terms based on the order the noun phrases appear the extracted text; and multiplying each query score by a corresponding proximity score to produce a respective relevance score. In some implementations, the results of the search are displayed based at least on the respective relevance scores.

Another aspect of the disclosure is a computer program product enabling identification of a playing broadcast media program by a device including a processor and a memory, the computer program product including instructions, storable in a non-transitory memory and executable by a processor. In some implementations, the instructions, when executed by a processor, cause a device to: capture display data provided by a set-top box; evaluate the display data to determine whether or not the display data includes a text overlay including information about the playing broadcast media program; and extract text in response to determining that the display data includes said text overlay, wherein the extracted text identifies the playing broadcast media program.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1A:
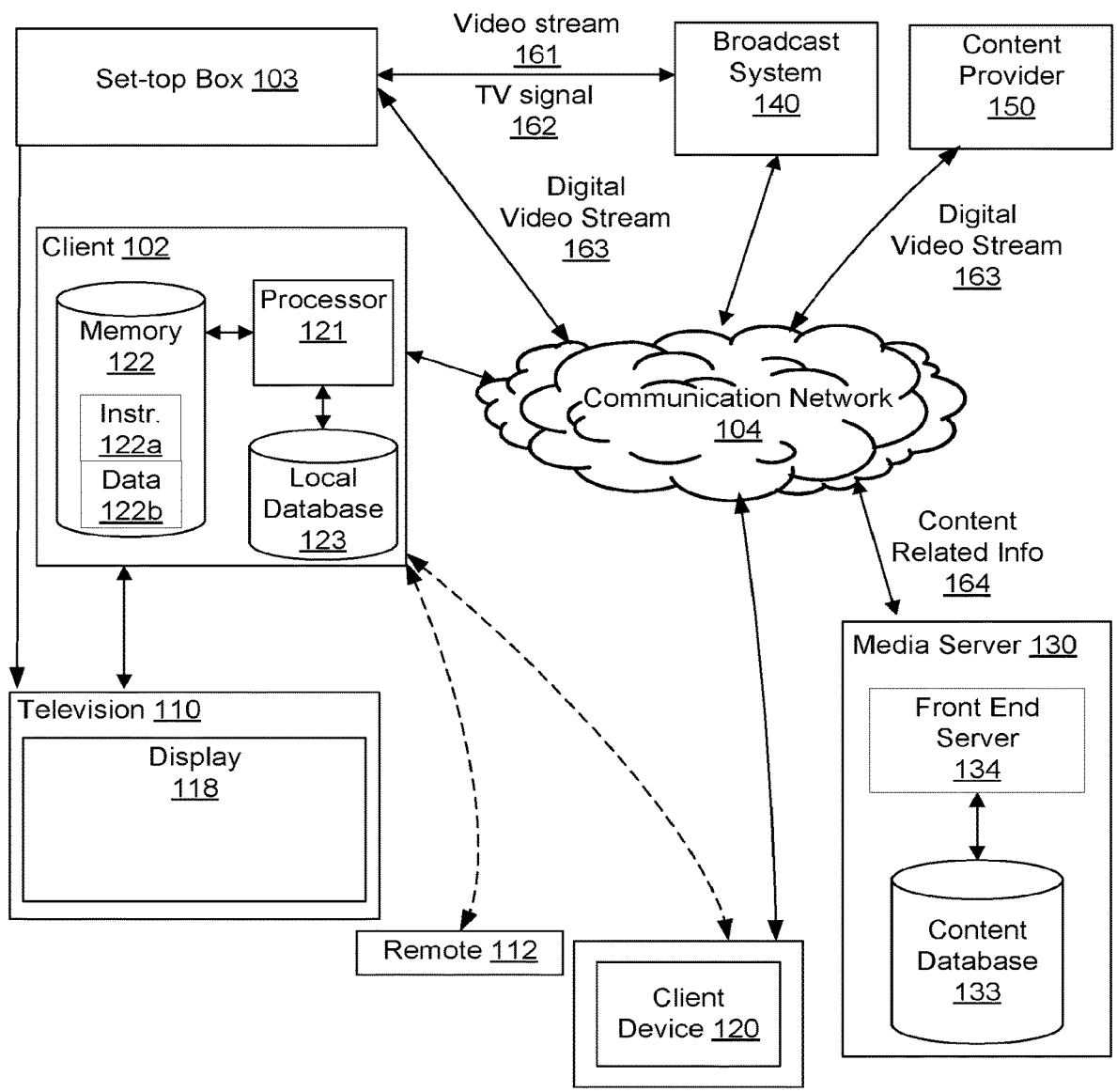
FIG. 1A is a diagram of an implementation of a client-server environment.

In accordance with common practice the various features illustrated in the drawings may not be drawn to scale. Accordingly, the dimensions of the various features may be arbitrarily expanded or reduced for clarity. In addition, the drawings may not depict all of the components of a given system, method or device; because, known methods, components, and circuits have not been described in exhaustive detail for the sake of brevity. Finally, like reference numerals are used to denote like features throughout the specification and figures.

DETAILED DESCRIPTION

The various implementations described herein include systems, methods and/or devices that are enabled to identify and present, in real time, Internet-accessible and/or Internet-based functionality, content and/or services associated with a particular television program concurrently playing on a television or display, as a part of an interactive television suite of technologies. In some implementations, the process of identifying associated content is enabled to reduce communication between the primary set-top box and a supplemental set-top box and/or television-integrated device, thereby reducing the need for one or more provider specific APIs. For example, one aspect of the disclosure is a method of identifying and presenting content associated with a media program by capturing display data associated with the media program, extracting text from the display data in response to determining that the display data includes a text overlay, wherein the extracted text is associated with the media program, performing an Internet search based on at least some of the extracted text, and displaying the search results.

Numerous details are described herein in order to provide a thorough understanding of the example implementations illustrated in the accompanying drawings. However, the invention may be practiced without these specific details. Well-known methods, procedures, components, and circuits have not been described in exhaustive detail so as not to unnecessarily obscure more pertinent aspects of the example implementations.

FIG. 1A is a diagram of an implementation of a client-server environment 100. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 100 includes a set-top box 103, a television (TV) 110, a client device 102 (e.g., a supplemental set-top box), a second screen client device 120 (e.g. a laptop, a tablet computer, smartphone, etc.), a remote control device 112, a communication network 104, a media server 130, a broadcast system 140, and a content provider 150. The second screen client device 120, the client device 102, the media server 130, the broadcast system 140, and the content provider 150 are capable of being connected to the communication network 104 in order to exchange information with one another and/or other devices and systems. The client-server environment 100 is merely an example provided to discuss more pertinent features of the present disclosure. Those skilled in the art will appreciate from the present disclosure that any number of such devices and/or systems may be provided in a client-server environment, and particular devices may be altogether absent.

In some implementations, the media server 130 is implemented as a single server system, while in other implementations it is implemented as a distributed system of multiple servers. Solely for convenience of explanation, the media server 130 is described below as being implemented on a single server system. Similarly, in some implementations, the broadcast system 140 is implemented as a single server system, while in other implementations it is implemented as a distributed system of multiple servers. Solely, for convenience of explanation, the broadcast system 140 is described below as being implemented on a single server system. Similarly, in some implementations, the content provider 150 is implemented as a single server system, while in other implementations it is implemented as a distributed system of multiple servers. Solely, for convenience of explanation, the content provider 150 is described below as being implemented on a single server system. Moreover, the functionality of the broadcast system 140 and the content provider 150 can be combined into a single server system. Additionally and/or alternatively, while only one broadcast system and only one content provider are illustrated in FIG. 1A for the sake of brevity, those skilled in the art will appreciate from the present disclosure that fewer or more of each may be present in an implementation of a client-server environment.

In some implementations, the second screen client device 120 (e.g. a tablet computer or laptop, etc.), the set-top box 103, the TV 110, the client device 102, and a remote control 112 are provided in combination within, for example, a home or commercial setting. The set-top box 103 is configured to receive and decode signals including media content from the broadcast system 140 or the like. In operation, the set-top box 103 decodes the signal received from the broadcast system 140 or the like and provides audio and video content to the TV 110 for display. While a TV has been used in the illustrated example, those skilled in the art will appreciate from the present disclosure that any number of displays devices, including computers, laptop computers, tablet computers, smart-phones and the like, can be used to display a video stream and play the associated audio stream. Additionally and/or alternatively, in some implementations the functions of the set-top box 103 and the TV 110 are combined into a single device.

In operation, the remote control 112 may be used to control the operation of one or more of the set-top box 103, the TV 110, and the client device 102. In one mode of operation, the client device 102 monitors the display 118 of the TV 110 to determine when a program information overlay is provided (i.e., shown on the display 118). In another mode of operation, the client device 102 emulates the function of the remote control device 112 to prompt the set-top box 103 to display the program information overlay. And in yet another mode of operation, the client device 102 receives IR transmissions from the remote control 112 that are directed to the set-top box 103. In turn, the client device 103 may then communicate with any one of the media monitoring server 130, the broadcast system 140, and the content provider 150 through the communication network 104. More specific details pertaining to how the client device 102 acquires real time program information related to what a particular user is watching is described below with reference to FIGS. 3-5.

In some implementations, the set-top box 103 is any computer device capable of connecting to the communication network 104, receiving video streams, extracting information from video streams and presenting video streams for the display using the TV 110 (or another display device). In some implementations, the set-top box 103 is configured as a receiver for cable TV and/or satellite TV, a digital video recorder (DVR), a digital media receiver, a TV tuner, a computer, and/or any other device that outputs TV signals. In some implementations, the TV 110 is a conventional TV display that is not connectable to the Internet and that displays digital and/or analog TV content received via over the air broadcasts or a satellite or cable connection.

Similarly, in some implementations the client device 102 is any computer device capable of connecting to the communication network 104 and the TV 110. As described below with reference to FIG. 5, in some implementations, the client device 102 is capable of receiving infrared (IR) transmissions directed to the set-top box 103 from the remote control device 112. Additionally and/or alternatively, in some implementations, the client device 102 is capable of wired and/or wireless communication with the client device 120. In some implementations, the client device 102 includes one or more processors 121, non-volatile memory 122 such as a hard disk drive, and a local database 123. In some implementations, the memory 122 includes application instructions 122a and associated data 122b. As discussed in greater detail below, the processor 121 executes the one or more applications in accordance with a set of instructions received from the media monitoring server 130. The client device 102 may also have input devices such as a keyboard, a mouse and/or track-pad (not shown). In some implementations, the client device 102 includes a touch screen display, a digital camera and/or any number of supplemental devices to add functionality.

As is typical of televisions, the TV 110 includes a display 118 and speakers (not illustrated). Additionally and/or alternatively, the TV 110 can be replaced with another type of display device for presenting video content to a user, such as for example, a computer, a tablet device, a mobile telephone, a projector, or other type of video display system. The display device can be coupled to the set-top box 103 via a wireless or wired connection.

As used herein, a TV signal is an electrical, optical, or other type of data transmitting medium that includes audio and/or video components corresponding to a TV channel or program. In some implementations, the TV signal is a terrestrial over-the-air TV broadcast signal or a sign distributed/broadcast on a cable-system or a satellite system. In some implementations, the TV signal is transmitted as data over a network connection. For example, the set-top box 103 can receive video streams from an Internet connection. Audio and video components of a TV signal are sometimes referred to herein as audio signals and video signals. In some implementations, a TV signal corresponds to a TV channel that is being displayed on the TV 110.

Figure 1B:
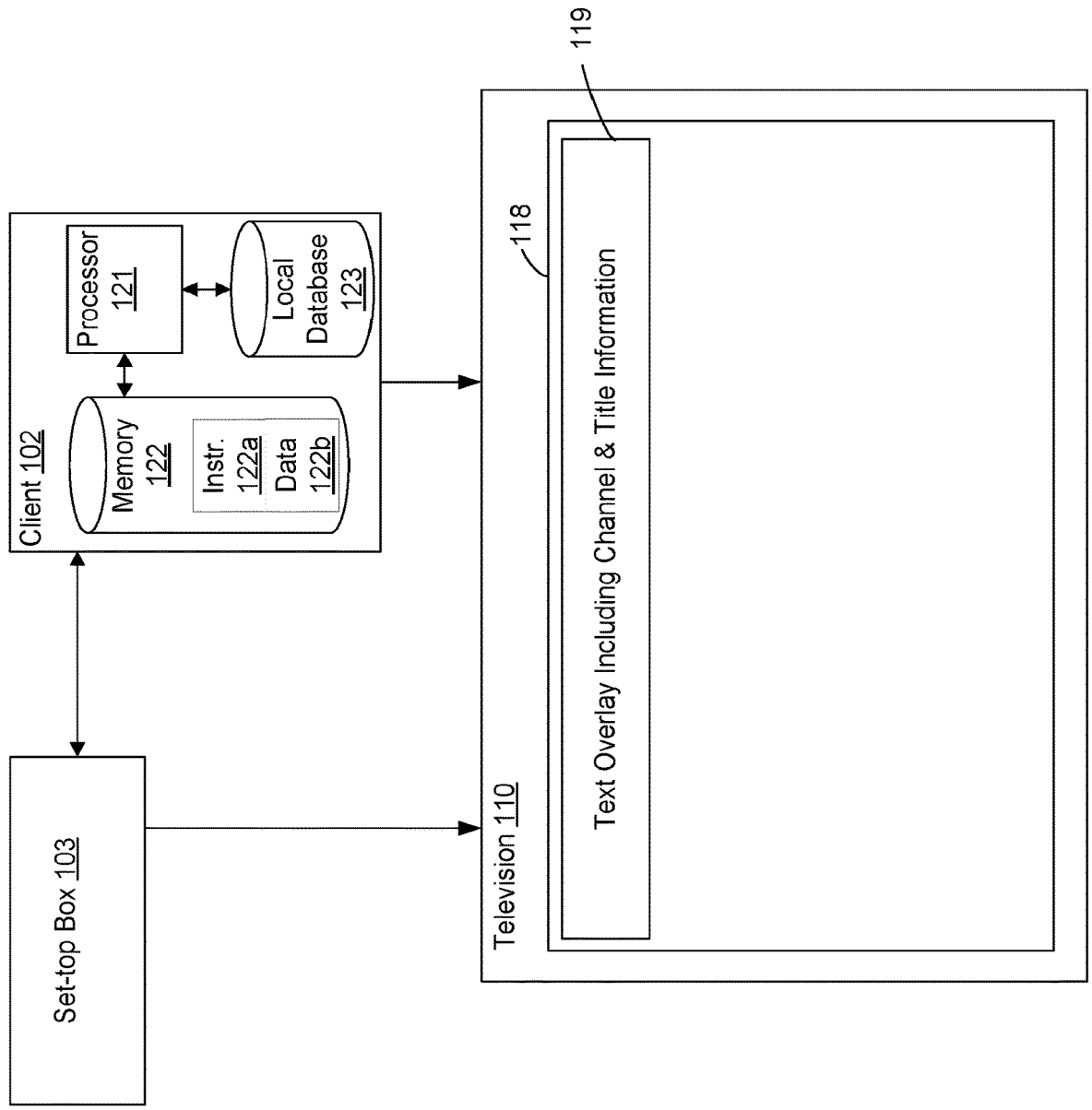
FIG. 1B is a diagram of a portion of the client-server environment including an example schematic screen display on a television.

FIG. 1B is a diagram of a portion of the client-server environment 100 including an example schematic screen display (i.e., a screenshot) on the TV 110. Again, the TV 110 includes the display 118 on which video of a media program is displayed. Further, while the video is being displayed, the set-top box 103 may provide a text overlay 119 that includes channel and title information. For example, the text overlay 119 typically includes the channel the media program is being presented on, as well as the title of the media program. The text overlay 119 also often includes information about actors, characters, and/or a synopsis of the media program presented as user readable text.

With further reference to FIG. 1A, the second screen client device 120 may be any computer device that is capable of connecting to the communication network 104, such as a computer, a laptop computer, a tablet device, a netbook, an Internet kiosk, a personal digital assistant, a mobile phone, a gaming device, or any other device that is capable of communicating with the media server 130.

The communication network 104 may be any combination of wired and wireless local area network (LAN) and/or wide area network (WAN), such as an intranet, an extranet, including a portion of the Internet, or a wireless network provided by a wireless carrier. It is sufficient that the communication network 104 provides communication capability between the second screen client device 120 and the media monitoring server 130. In some implementations, the communication network 104 uses the HyperText Transport Protocol (HTTP) to transport information using the Transmission Control Protocol/Internet Protocol (TCP/IP). HTTP permits the client device 102 to access various resources available via the communication network 104. However, the various implementations described herein are not limited to the use of any particular protocol.

In some implementations, the media monitoring server 130 includes a front end server 134 that facilitates communication between the media monitoring server 130 and the communication network 104. The front end server 134 receives content information from the client device 102. As described in greater detail below, in some implementations, the content information includes program information, such as the program title, actor names, character names, plot summaries, etc. In some implementations, the front end server 134 is configured to send a set of instructions to the client device 102. In some implementations, the front end server 134 is configured to send content files, links to content files and/or metadata associated with the content files. The term "content file" includes any document or content of any format including, but not limited to, a video file, an image file, a music file, a web page, an email message, an SMS message, a content feed, an advertisement, a coupon, a playlist or an XML document. In some implementations, the front end server 134 is configured to send or receive one or more video streams. In some implementations, the front end server 134 is configured to receive content directly from the broadcast system 140 and/or the content provider 150 over the communication network 104.

In some implementations, the media monitoring server 130 includes a content database 133. In some implementations, the content database 136 includes advertisements, videos, images, music, web pages, email messages, SMS messages, content feeds, advertisements, coupons, playlists, XML documents, and ratings associated with various media content or any combination thereof. In some implementations, the content database 136 includes links to advertisements, videos, images, music, web pages, email messages, SMS messages, content feeds, advertisements, coupons, playlists, XML documents and ratings associated with various media content. In some implementations, the content database 133 is a distributed database.

In some implementations, the broadcast system 140 includes media content such as TV programs. In some implementations, the broadcast system 140 also includes metadata associated with one or more of the TV programs, and application program interface instructions. In some implementations, the application program interface instructions include instructions that can be provided to a client device and/or may be executed by the broadcast system 140 under a client-server model or the like in order to link a particular TV program with the associated metadata and/or link the TV program and the associated metadata 142 with external data and/or services, such as a social networking application. Similarly, in some implementations, the content provider 150 additionally and/or alternatively includes media content such as TV programs, as well as metadata associated with one or more of the TV programs.

Figure 2:
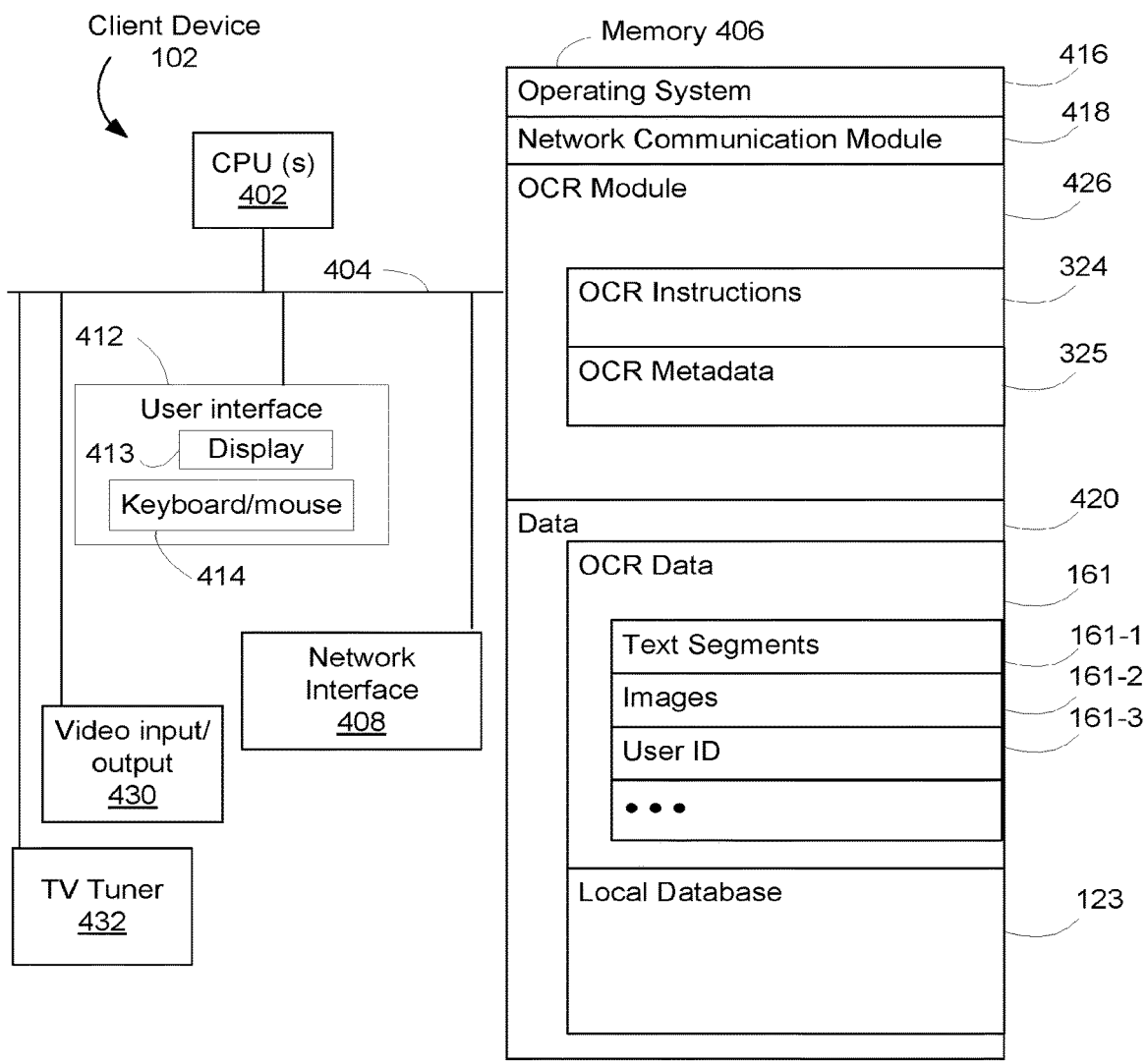
FIG. 2 is a diagram of an example implementation of a client device operable as a supplemental set-top box and/or a television-integrated device.

FIG. 2 is a diagram of an example implementation of the client device 102, discussed above with reference to FIG. 1A, and which may be operable as a supplemental set-top box and/or a television-integrated device. While certain specific features are illustrated, those skilled in the art will appreciate from the present disclosure that various other features have not been illustrated for the sake of brevity and so as not to obscure more pertinent aspects of the implementations disclosed herein. To that end, the client device 102 includes one or more processing units (CPU's) 402, one or more network or other communications interfaces 408, memory 406, a TV tuner 432, a video I/O 430, and one or more communication buses 404, for interconnecting these and various other components. The communication buses 404 optionally include circuitry (sometimes called a chipset) that interconnects and controls communications between system components. The client device 102 may also include a user interface 412 comprising a display device 413 and a keyboard and/or mouse (or other pointing device) 414 and/or a remote control (etc.). Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternatively the non-volatile memory device(s) within memory 406, comprises a non-transitory computer readable storage medium. In some implementations, memory 406 or the computer readable storage medium of memory 406 store the following programs, modules and data structures, or a subset thereof including operation system 416, network communication module 418, an OCR module 426 and data module 420.

The operating system 416 includes procedures for handling various basic system services and for performing hardware dependent tasks.

The network communication module 418 facilitates communication with other devices via the one or more communication network interfaces 404 (wired or wireless) and one or more communication networks, such as the Internet, other wide area networks, local area networks, metropolitan area networks, and so on.

In some implementations, the OCR module 426 enables the client device 102 to process screen shots (e.g. images from the TV 110) to obtain the program information included in the program information overlay provided by the primary set-top box 103. To that end, the OCR module 426 includes OCR instructions 324 and metadata 325.

In some implementations, the data module 420 includes OCR data 161 and a local database 123 of program information. In some implementations, the program information is received from a broadcast system and/or content provider. In some implementations, the OCR data 161 includes text segments 161-1, images 161-2 and user ID information 161-3.

Each of the above identified elements may be stored in one or more of the previously mentioned memory devices, and each of the modules or programs corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 406 stores a subset of the modules and data structures identified above. Furthermore, memory 406 may store additional modules and data structures not described above.

Figure 3:
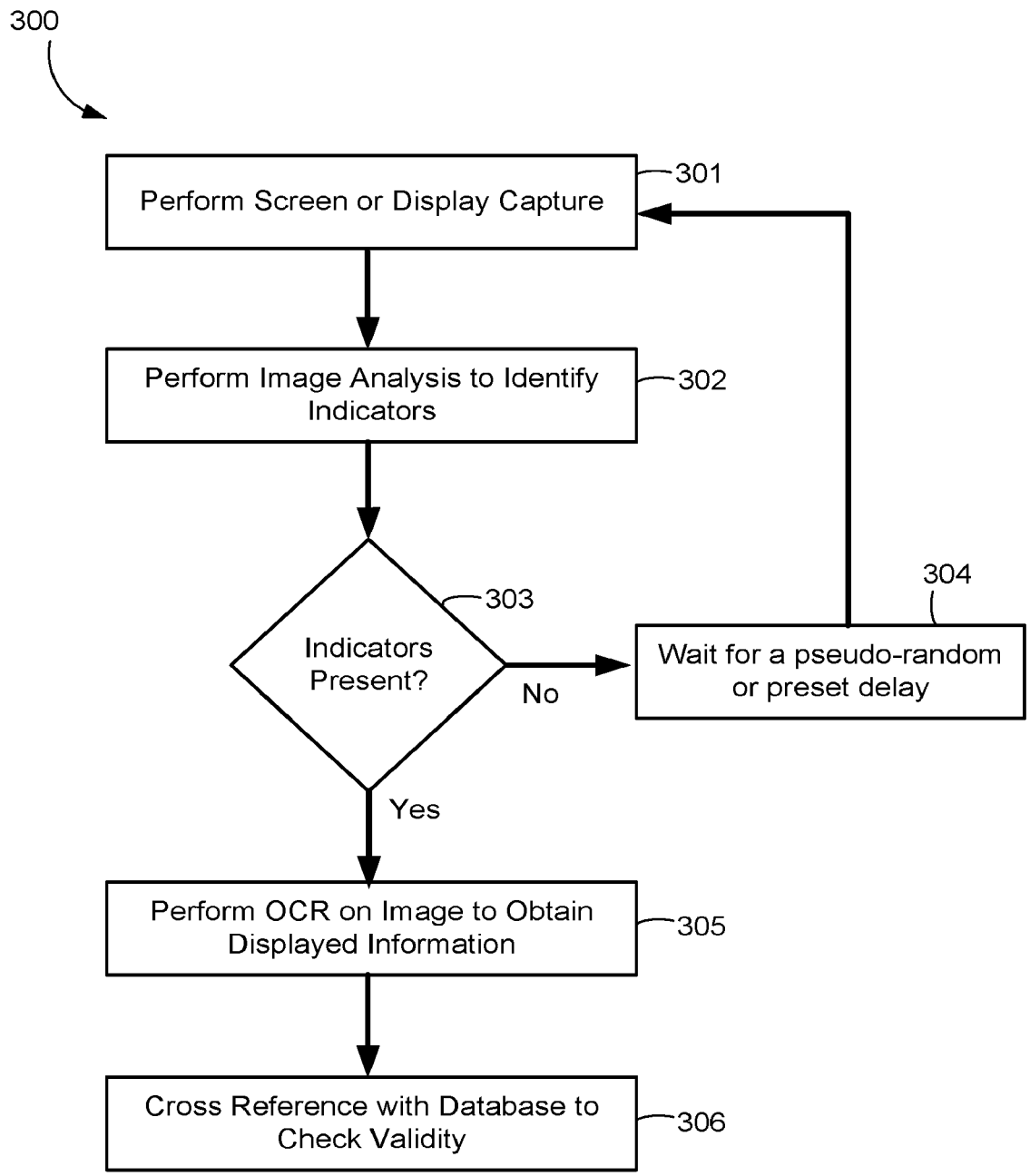
FIG. 3 is a flowchart representation of an implementation of a method of determining what a consumer is currently watching.

FIG. 3 is a flowchart representation of an implementation of a method 300 of determining what a consumer is currently watching. In some implementations, the method is performed by a device, such as a supplemental set-top box and/or a television integrated module, in order to enable determining what a consumer is currently watching. For example, with reference to FIG. 1A, in some implementations, the method 300 is performed by the client device 102 (i.e., the supplemental set-top box). As noted above, when a user changes the channel or requests program information by, for example, using one or more channel selection options or pressing an "INFO" button, the primary set-top box displays an overlay including program information, such as the current channel, the title of the playing program and information about the program. Accordingly, the method includes identifying instances during which the primary set-top box provides the overlay by monitoring the display output provided by the primary set-top box, and parsing the overlay for the desired information. Additionally and/or alternatively, in some implementations, the method includes detecting when channel identifiers are displayed without being prompted by user interaction (i.e., a user pressing a button).

To that end, the method includes performing a screen or display data capture from the display device that is displaying the television program selected by the consumer through a primary set-top box or the like in order acquire an image of what is being displayed (301). In some implementations, the screen capture data is obtained from the video signal provided by the primary set-top box. Additionally and/or alternatively, in some implementations, the screen capture data is obtained from a display (i.e., video) card included in the set-top box and/or the operating system of the set-top box. Additionally and/or alternatively, the screen capture data is obtained from a TV app running on at least one of the primary set-top box, the supplemental set-top box, the TV, and a second screen device. Additionally and/or alternatively, in some implementations, the supplemental set-top box (or the like) includes a camera operable to capture an image of the display of a television or the like. The method includes analyzing the image to identify whether the image includes indicators that an overlay is being displayed by the primary set-top box (302). For example, in some implementations, the indicators include the color of the overlay, the percentage of display area the overlay typically covers when visible, the arrangement of text with the overlay, contrast between a portion of the display likely to be displaying the program and another portion of the display likely to be displaying the overlay.

The method includes determining whether one or more of the indicators are present as indicated by the image analysis (303). If none of the indicators are present for a particular screen capture ("No" path from 303), the method includes waiting a pseudo-random amount of time or a preset delay time (304) before capturing another screen shot or the like. On the other hand, if at least one indicator is present or another threshold number of the indicators is present ("Yes" path from 303), the method includes applying an optical character recognition technique to the image in order to identify and extract the displayed information (305). Having extracted the title and/or program information, the method includes cross-referencing the extracted information with a local and/or remote database to ensure the validity of the information (306). For example, with further reference to FIG. 1A, the client device 102 may communicate with the media server 130 in order to check the validity of the extracted display information. More specifically, the client device 102 may transmit all or a portion of the extracted information to the media server 130. In turn, the media server 130 may then check the extracted information against a content database (e.g., the content database 133, FIG. 1) to ensure that the extracted data is correct and/or provide corrected information to the client device 102 when the extracted data is incorrect but can be matched to database information.

Figure 4:
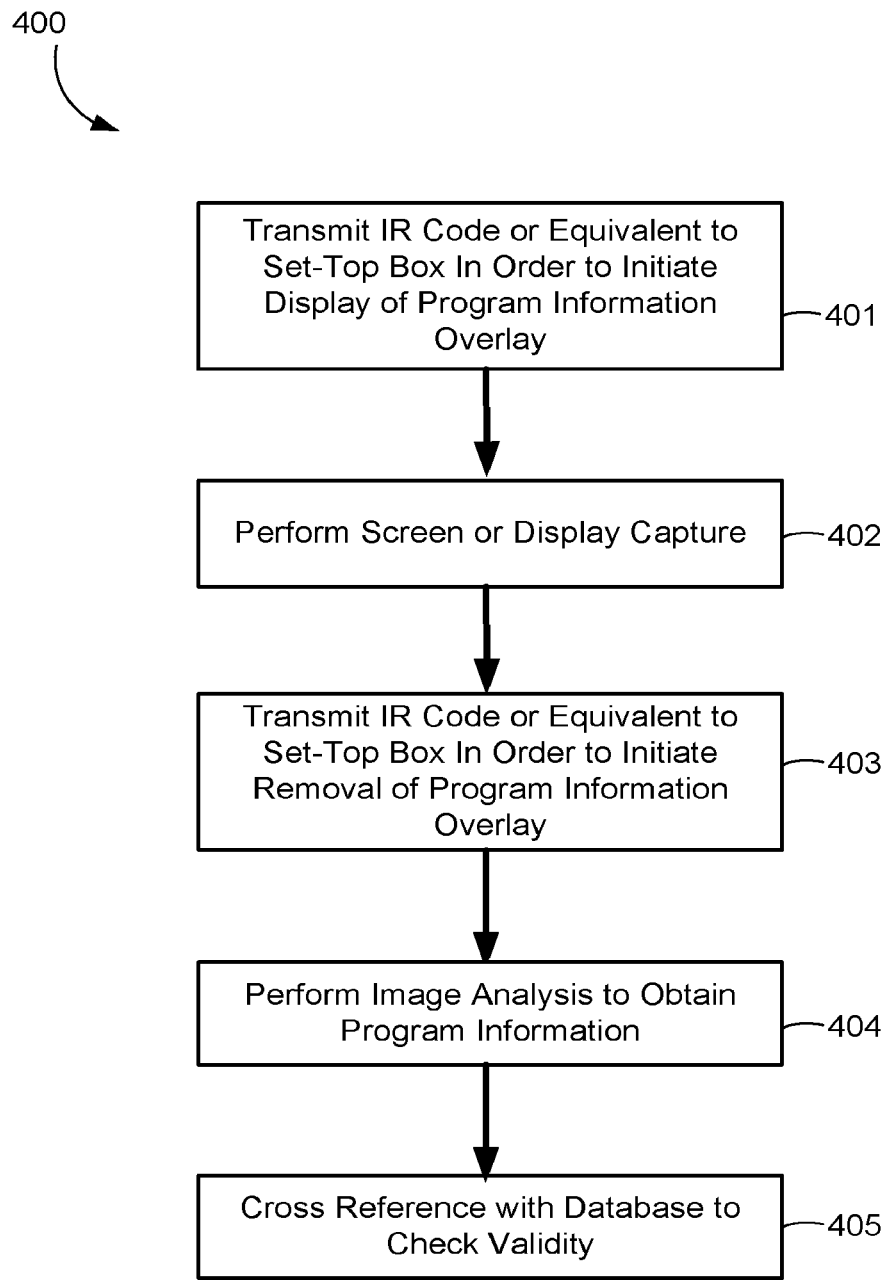
FIG. 4 is a flowchart representation of an implementation of a method of determining what a consumer is currently watching.

FIG. 4 is a flowchart representation of an implementation of a method 400 of determining what a consumer is currently watching. In some implementations, the method is performed by a device, such as a supplemental set-top box and/or a television integrated module, in order to enable determining what a consumer is currently watching by, in part, emulating the operation of a remote control device associated with the primary set-top box. To that end, the method includes transmitting a first infrared (IR) code (or the like) to the primary set-top box in order to initiate the display of the program information overlay (401). For example, with further reference to FIG. 1A, one of the client device 102 and the client device 120 may transmit an IR code to the set-top box 103.

The method then includes performing a screen capture to acquire a screen shot (i.e. image) including the program information overlay (402). Having acquired the screen shot, the method includes transmitting a second IR code (or the like) to the primary set-top box in order to initiate the removal of the program information overlay on the playing television program (403). The method includes analyzing the image or screen shot to obtain the program information presented in the overlay (404). Having extracted the title and/or program information, the method includes cross-referencing the extracted information with a local and/or remote database 133 to ensure the validity of the information (406).

Figure 5:
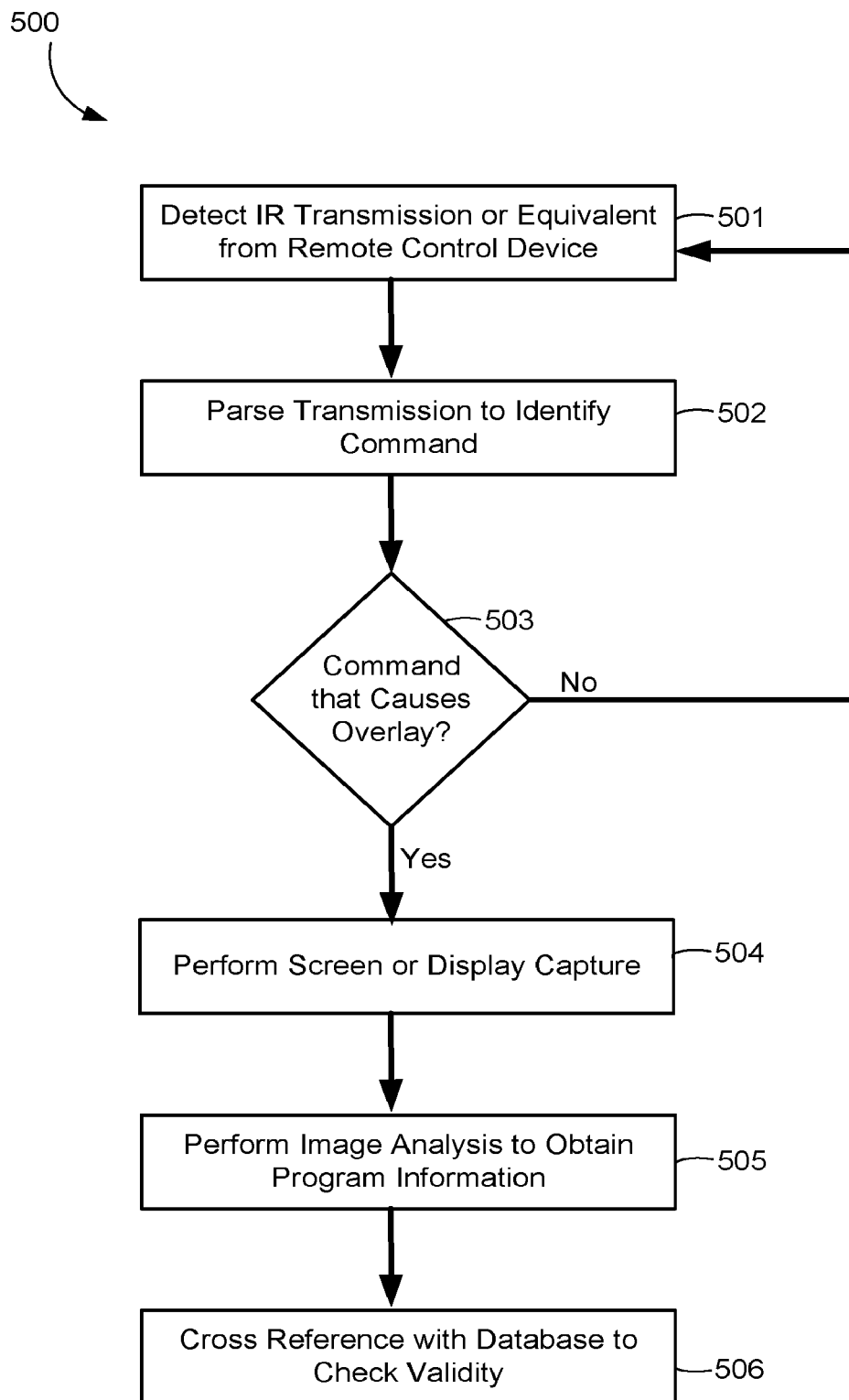
FIG. 5 is a flowchart representation of an implementation of a method of determining what a consumer is currently watching.

FIG. 5 is a flowchart representation of an implementation of a method 500 of determining what a consumer is currently watching. In some implementations, the method is performed by a device, such as a supplemental set-top box and/or a television integrated module, in order to enable determining what a consumer is currently watching, by detecting IR transmission from a remote control device associated with the primary set-top box. For example, with further reference to FIG. 1A, the client device 102 may detect IR transmissions directed to the primary set-top box 103 from the remote control device 120.

To that end, the method includes detecting an IR transmission or equivalent from a remote control device associated with a primary set-top box (501). In turn, the method includes parsing the transmission in order to identify the command that is represented by the IR transmission (502). Having identified the command, the method includes determining whether or not the identified command causes the primary set-top box to provide the program information overlay in the video stream provided to the display device. If the detected command is not likely to cause the primary set-top box to provide the program information overlay ("No" path from 503), the method includes circling back to detect another IR transmission. On the other hand, if the detected command is likely to cause the primary set-top box to provide the program information overlay ("Yes" path from 503), the method includes performing a screen or display data capture from the display device that is displaying the television program selected by the consumer through a primary set-top box or the like in order acquire an image of what is being displayed (504). The method includes analyzing the image or screen shot to obtain the program information presented in the overlay (505). And, the method includes cross-referencing the extracted information with a local and/or remote database to ensure the validity of the information (506).

Figure 6:
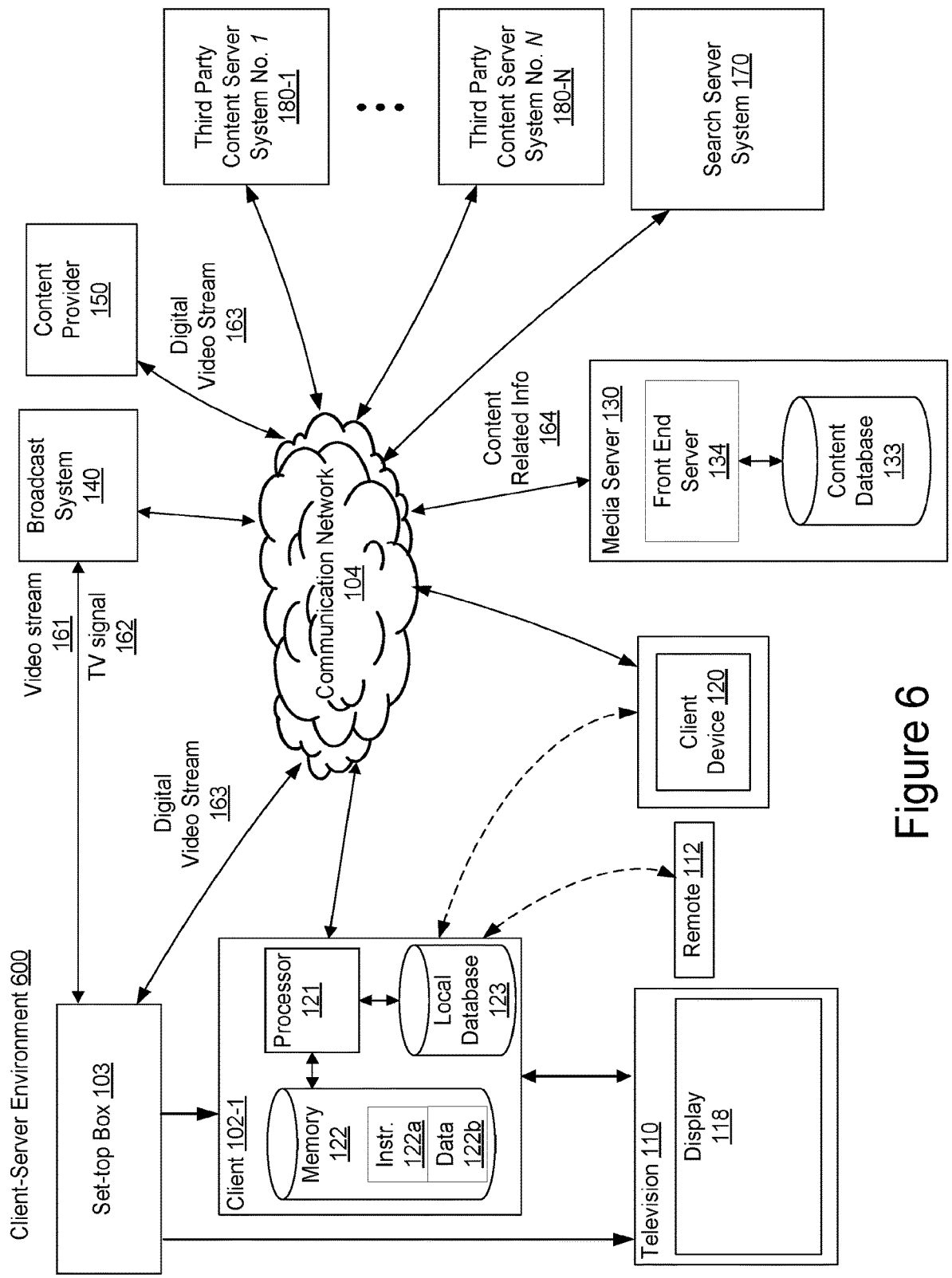
FIG. 6 is a diagram of an implementation of a client-server environment.

FIG. 6 is a diagram of an implementation of a client-server environment 600. The client-server environment 600 illustrated in FIG. 6 is similar to and adapted from the client-server environment 100 illustrated in FIG. 1A. Elements common to each include common reference numbers, and only the differences between FIGS. 1A and 6 are described herein for the sake of brevity. Moreover, while certain specific features are illustrated, those skilled in the art will appreciate from the present disclosure that various other features have not been illustrated for the sake of brevity and so as not to obscure more pertinent aspects of the example implementations disclosed herein.

To that end, with reference to FIG. 6, the client-server environment 600 additionally includes a search server system 170, and a number of third party content server systems 180-1, . . . , 180-N. In some implementations, the search server system 170 is implemented as a single system, while in other implementations it is implemented as a distributed system of multiple servers and systems. Solely for convenience of explanation, the search server system 170 is described below as being implemented as a single system. Similarly, in some implementations, each of the third party content server systems 180-1, . . . , 180-N is implemented as a single server system, while in other implementations each of the third party content server systems 180-1, . . . , 180-N is implemented as a distributed system of multiple servers. Solely, for convenience of explanation, each of the third party content server systems 180-1, . . . , 180-N is described below as being implemented on a respective single server system.

In some implementations, as described in greater detail below with reference to FIG. 9, the client device 102 (e.g. a supplemental set-top box, a television integrated device, etc.) is further configured to identify and present Internet-accessible content associated with a media program by capturing display data associated with the media program presented on the television 110. In some implementations, the client device 102 is configured to receive a display signal from the primary set-top box 103 and pass the display signal to the television or the like. As a result, in such implementations, capturing the display data includes processing the display signal provided by the primary set-top box 103. The client device 102 then extracts text from the captured display data in response to determining that the display data includes a text overlay, wherein the extracted text is associated with the media program.

Subsequently, the client device 102 performs an Internet search based on at least some of the extracted text by submitting a search query to the search server system 170. In turn, the search server system 170 responds to a received search query by providing information and/or access to information stored on one or more of the third party content server systems 180-1, . . . , 180-N, as a set of results to the client device 102. The client device 102 operates to display at least a portion of the search results on at least one of the television 110 and the client device 120 (i.e., a second screen device, such as a tablet computer).

Figure 7A:
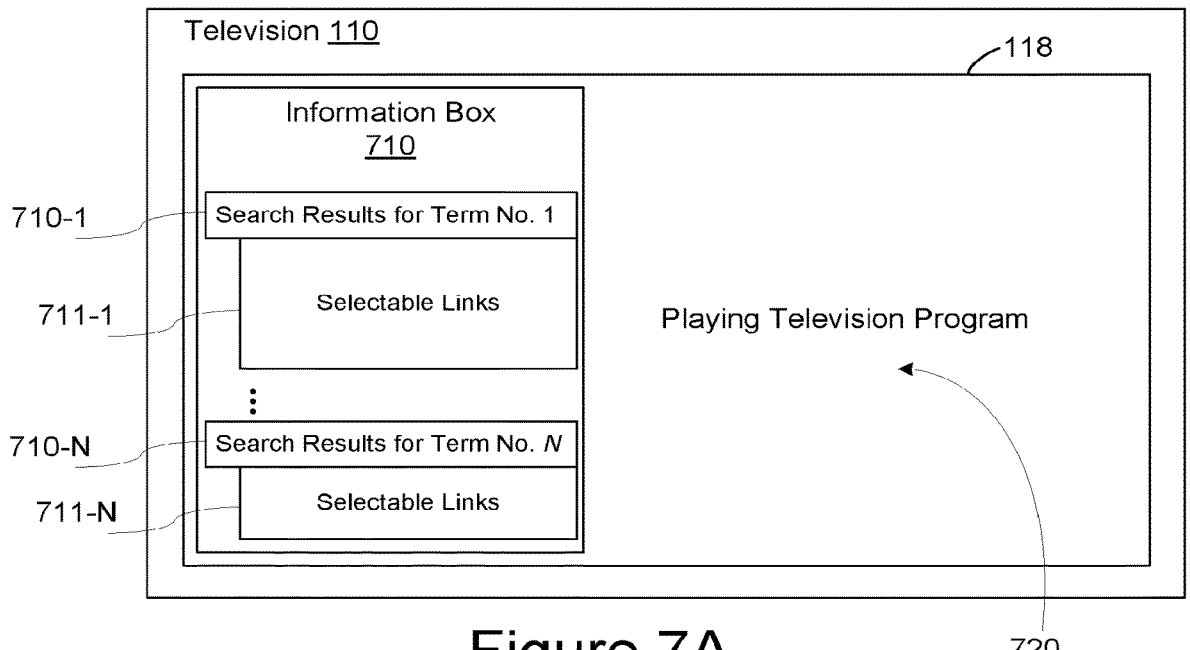
FIG. 7A is a schematic diagram of an example screenshot of a television display in accordance with some implementations.

FIG. 7A is a schematic diagram of an example screenshot of a television display 118 of the television 110 that is operating to display an information box 710 in accordance with some implementations. While a television is illustrated, those skilled in the art will appreciate from the present disclosure that the systems and methods disclosed herein may be used in combination with any media presentation device. In operation, with reference to FIGS. 6 and 7A, in some implementations, the client device 102 provides display instructions and display data (i.e., a display signal) to the television 110 in addition to the display signal provided by the primary set-top box 103. The display instructions cause the television 110 to display the information box 710, provided by the display data, as visual overlay obstructing at least a portion of the playing television program 720 presented on the screen 118. The display signal provided by the primary set-top box 103 includes the data for presenting the playing television program 720. In some implementations, the display data provided by the client device 102 includes the optical attributes of the information box 710, including, for example, the relative size, shape and color of the information box 710. In some implementations, the display data also includes search results associated with a playing television program 720 obtained by the process briefly described above. For example, as shown in FIG. 7A, the information box 710 includes a first indicator of search results 710-1 associated with a first search term and a first number of selectable hyperlinks 711-1. More generally, the information box 710 includes a number of search result indicators up to and including an $N^{th}$ indicator of search results 710-N associated with an $N^{th}$ search term and a $N^{th}$ number of selectable hyperlinks 711-N. In some implementations, each indicator of search results is associated with at least one of search results from a general Internet search, a targeted search for associated news items, a targeted search for associated images, a targeted search for associated Internet-accessible media content (e.g. videos, music, etc.), and a targeted search for associated social media content.

Figure 7B:
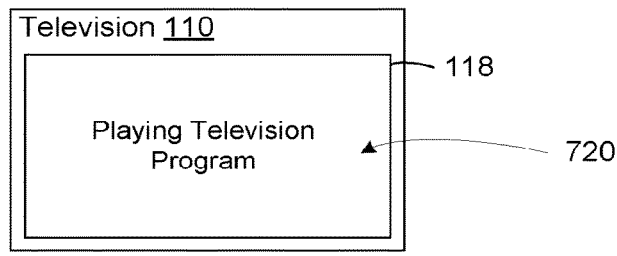
FIG. 7B is a schematic diagram of example screenshots of a television display and a second screen client device (i.e., a tablet) in accordance with some implementations.
Figure 7B:
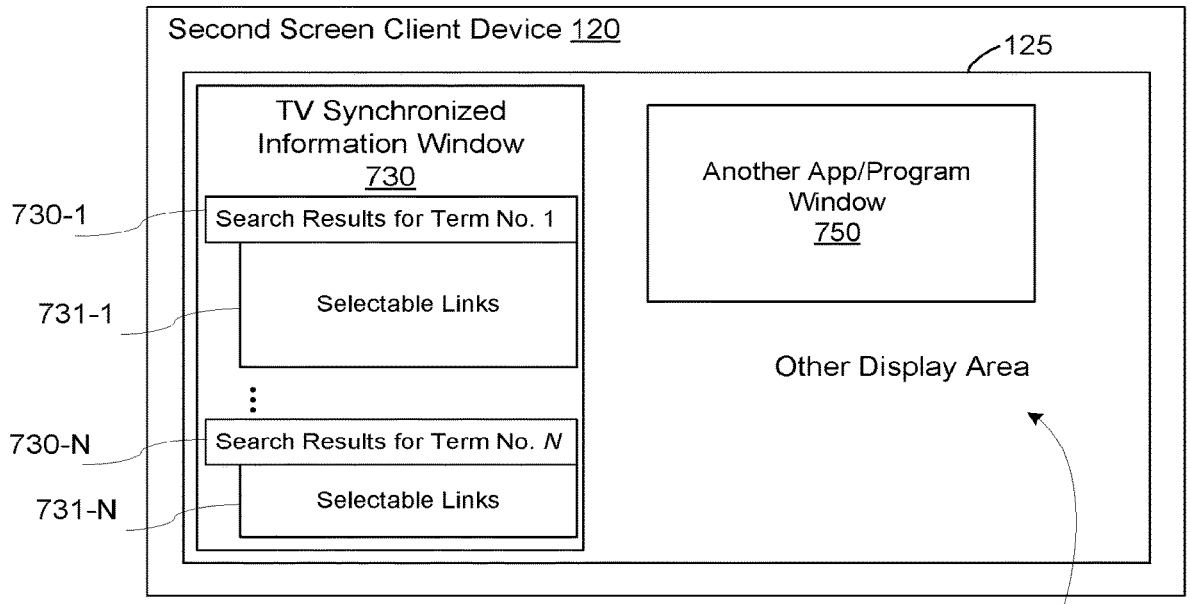

FIG. 7B is a schematic diagram of example screenshots of the television display 118 and the second screen client device 120 in accordance with some implementations. In contrast to the example illustrated in FIG. 7A, an information box 730, providing search results associated with the playing television program 720, is displayed on the screen 125 of the second screen client device 120. In operation, with reference to both FIGS. 6 and 7B, in some implementations, the client device 102 provides display instructions and display data (i.e., a display signal) to second screen client device 120. The display instructions cause the second screen client device 120 to display the information box 730, provided by the display data, as visual overlay obstructing at least a portion of the screen 125. In some implementations, the display data includes the optical attributes of the information box 730, including, for example, the relative size, shape and color of the information box 730. In some implementations, the information box 730 is presented in combination with another application (or program) window 750, and/or another portion of the display screen includes other display area 740 that does not include a window or the like. In some implementations, the display data also includes search results associated with a playing television program 720 obtained by the process briefly described above. For example, as shown in FIG. 7B, the information box 730 includes a first indicator of search results 730-1 associated with a first search term and a first number of selectable hyperlinks 731-1. More generally, the information box 730 includes a number of search result indicators up to and including an $N^{th}$ indicator of search results 730-N associated with an $N^{th}$ search term and a $N^{th}$ number of selectable hyperlinks 731-N. As noted above, in some implementations, each indicator of search results is associated with at least one of search results from a general Internet search, a targeted search for associated news items, a targeted search for associated images, a targeted search for associated Internet-accessible media content (e.g. videos, music, etc.), and a targeted search for associated social media content.

Figure 8:
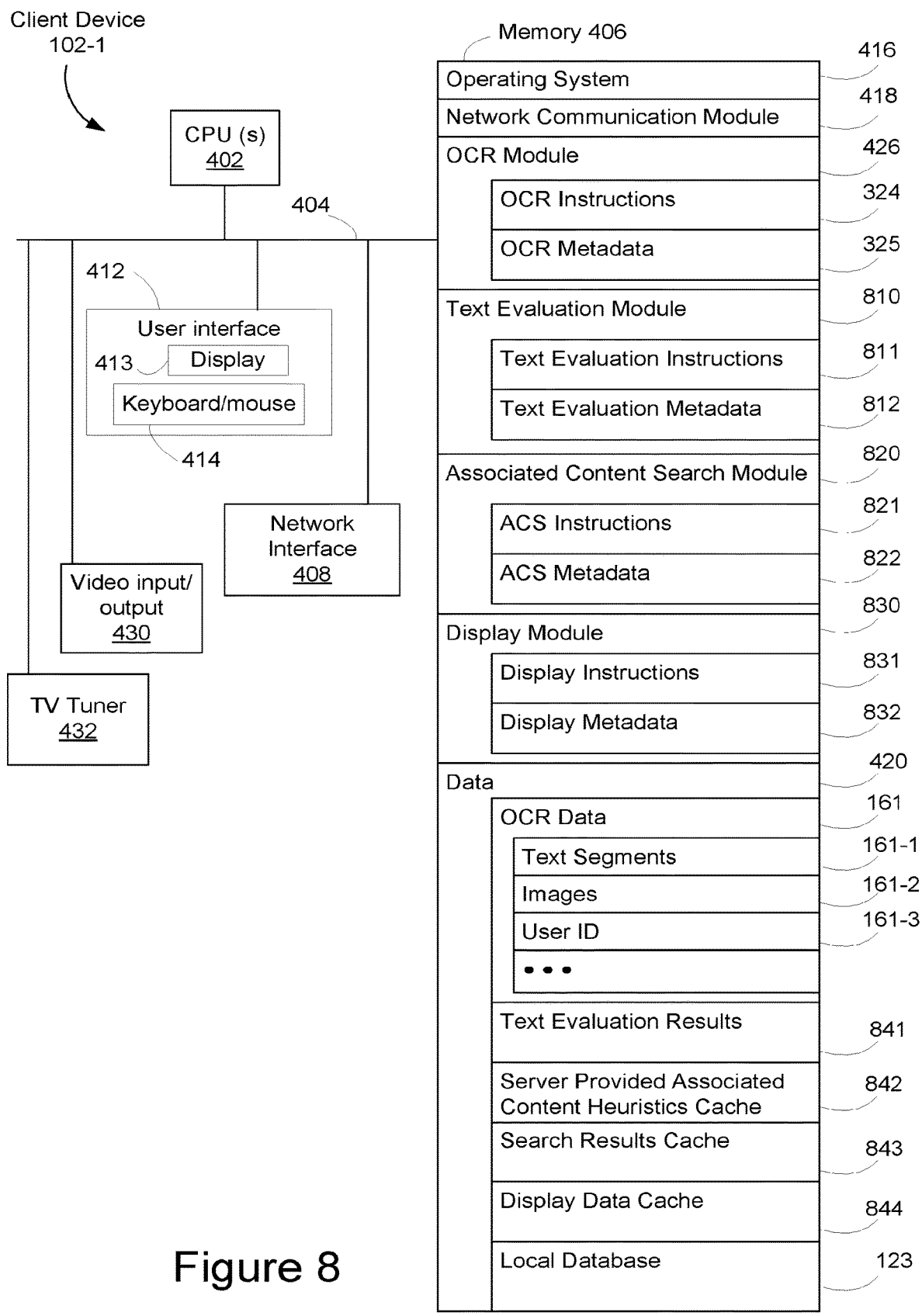
FIG. 8 is a diagram of an example implementation of a client device operable as at least one of a supplemental set-top box, a television-integrated device, and/or second screen client device in accordance with some implementations.

FIG. 8 is a diagram of an example implementation of a client device 102-1 operable as at least one of a supplemental set-top box, a television-integrated device, and/or second screen client device in accordance with some implementations. Client device 102-1 illustrated in FIG. 8 is similar to and adapted from the client device 102 illustrated in FIG. 2. Elements common to each include common reference numbers, and only the differences between FIGS. 2 and 8 are described herein for the sake of brevity. Moreover, while certain specific features are illustrated, those skilled in the art will appreciate from the present disclosure that various other features have not been illustrated for the sake of brevity and so as not to obscure more pertinent aspects of the example implementations disclosed herein.

To that end, with reference to FIG. 8, in some implementations, the memory 406 of the client device 102-1 additionally includes a text evaluation module 810, an associated content search module 820 and a display module 830. Additionally, the data module 420 included in the memory 406 further includes text evaluation results 841, a server provided associated content heuristics cache 842, a search results cache 843, and a display data cache 844.

As described above, in some implementations, the OCR module 426 enables the client device 102-1 to process screen shots (e.g. images from the TV 110) to obtain the program information included in the program information overlay provided by the primary set-top box 103. To that end, the OCR module 426 includes OCR instructions 324 and metadata 325.

In some implementations, the text evaluation module 810 enables the client device 102-1 to identify terms pertinent to the television program from the program information obtained by the OCR module 426. To that end, the text evaluation module 810 includes text evaluation instructions 811 and associated metadata 812. The text evaluation instructions 811 are described in greater detail below with reference to FIG. 10. In some implementations, the results of the execution of the text evaluation instructions 811 results in data that is stored in the data evaluation module 420 as text evaluation results 841. In some implementations, the text evaluation results 841, which are separate from the text evaluation metadata 812, include one or more text strings associated with television programs that are frequently selected by the user. In some implementations, as described below with reference to FIG. 9, the text strings are refined using at least one of data stored in the server provided associated content heuristics cache 842 and the search results cache 843. In some implementations, the server provided associated content heuristics cache 842 includes heuristics provided by a search server system 170 and/or media server 130 that are associated with one or more television programs. In some implementations, the heuristics include data that has been collected from prior searches submitted by a multitude of other users and/or by the content providers to enable users to more efficiently find Internet-accessible and/or Internet-based functionality, content and/or services associated with a particular television program concurrently playing on a television or display. In some implementations, the search results cache 843 includes data from prior search queries submitted from the client device 102-1. In some implementations, the data from prior search queries is sorted based on which queries spurred the most interest from the one or more users associated with the client device 102-1, in terms of, for example, following hyperlinks provided in search results from a particular search query.

In some implementations, the associated content search module 820 enables the client device 102-1 to perform searches for Internet-accessible and/or Internet-based functionality, content and/or services associated with a particular television program concurrently playing on a television or display. In order to perform a search, the associated content search module 820 produces one or more search queries from the one or more pertinent terms identified by the text evaluation module 810, and the one or more search queries are transmitted to a search server system (e.g. search server system 170). To these ends, the associated content search module 820 includes associated content search instructions 821 and corresponding metadata 822. In some implementations, as described below with reference to FIG. 9, the one or more search queries are refined using at least one of data stored in the server provided associated content heuristics cache 842 and the search results cache 843.

In some implementations, the display module 830 operates to provide display instructions and display data to a television or the like. To that end, the display module 830 includes display instructions 831 and corresponding metadata 832. In some implementations, the display instructions 831 and metadata 832 includes the relative size, shape and color of the information box used to display the search results, user preferences, and instructions directing the display on at least one of a television and second screen device. Moreover, in some implementations, the display data cache 844 is used to store images and other data frequently downloaded by the client device 102-1.

Figure 9:
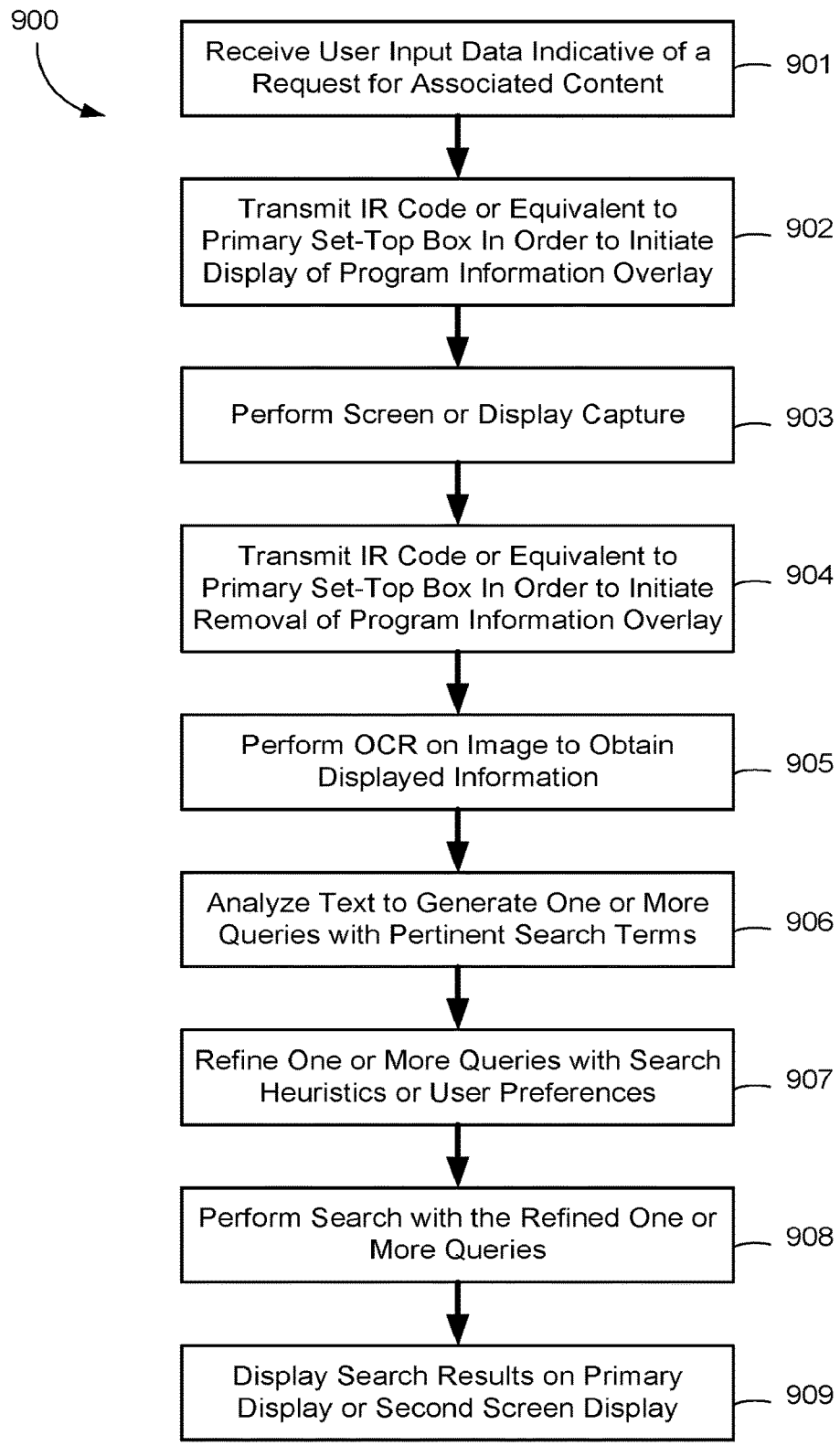
FIG. 9 is a flowchart representation of an implementation of a method of identifying and presenting Internet-accessible content associated with a currently playing television program.

FIG. 9 is a flowchart representation of an implementation of a method 900 of identifying and presenting Internet-accessible content associated with a currently playing television program. In some implementations, the method 900 is performed by a device, such as a supplemental set-top box and/or a television integrated module, in order to enable determining what a consumer is currently watching. For example, with reference to FIGS. 6 and 8, in some implementations, the method 900 is performed by the client device 102-1 (e.g., a supplemental set-top box). Briefly, the method 900 includes receiving a request for a content search associated with the currently playing television program, signaling a primary set-top box to display program data, extracting text from displayed program data, performing an Internet search based on at least some of the extracted text, and displaying the search results.

To that end, the method 900 includes receiving user input data indicative of a user input of a request from associated content (901). For example, with continued reference to FIG. 6, the client device 102-1 receives a request for an associated content search from a user operating the remote control 112 and/or the second screen device 120. In accordance with some implementations, the user selects or presses an "INFO" button (or the like) on the remote control 112 or on an application interface displayed on the second screen device 120. The remote control 112 or the second screen device 120 then transmits a data signal indicative of the request for an associated content search to client device 102-1, in response to receiving the user input.

The method 900 then includes transmitting a first infrared (IR) code (or the like) to the primary set-top box in order to initiate the display of the program information overlay (902). For example, with further reference to FIG. 6, one of the client device 102-1 and the client device 120 may transmit an IR code to the primary set-top box 103. The method 900 then includes performing a screen capture to acquire a screen shot (i.e., image data) including the program information overlay (903). The method then optionally includes transmitting a second IR code (or the like) to the primary set-top box in order to initiate the removal of the program information overlay on the playing television program (904). In some implementations, the second IR code (or the like) is not transmitted and the overlay is allowed to remain on-screen until the primary set-top box is operates to remove it based on the configuration of the primary set-top box. The method 900 includes performing optical character recognition on the captured screen shot to obtain the program information text presented in the overlay (905). Having extracted the program information text, the method 900 includes analyzing the program information text to generate one or more search queries with pertinent search terms derived from the program information text (906). An example of an implementation of a method of text analysis resulting in one or more pertinent search queries is described below with reference to FIG. 10.

The method 900 optionally includes refining the search queries using search heuristics and/or user preferences. For example, as described above, with further reference to FIGS. 6 and 8, in some implementations, the method 900 includes refining the one or more search queries using at least one of data stored in the server provided associated content heuristics cache 842 and the search results cache 843. In some implementations, the server provided associated content heuristics cache 842 includes heuristics provided by a search server system and/or media server that are associated with one or more television programs. In some implementations, the heuristics include data that has been collected from prior searches submitted by a multitude of other users and/or by the content providers to enable users to more efficiently find Internet-accessible and/or Internet-based functionality, content and/or services associated with a particular television program concurrently playing on a television or display. In some implementations, a search results cache includes data from prior search queries submitted from the client device. In some implementations, the data from prior search queries is sorted based on which queries spurred the most interest from the one or more users associated with the client device, in terms of, for example, following hyperlinks provided in search results from a particular search query.

The method 900 includes performing the search, with the one or more search queries or the refined one or more search queries, for Internet-accessible and/or Internet-based functionality, content and/or services associated with a particular television program concurrently playing on a television or display (908). The example described with reference to FIG. 10 more specific details regarding how search results can be sorted, scored and presented so that the more pertinent search results are presented at or near the top of the displayed search results. The method 900 includes displaying the search results on the television and/or a second screen client device (909).

Figure 10:
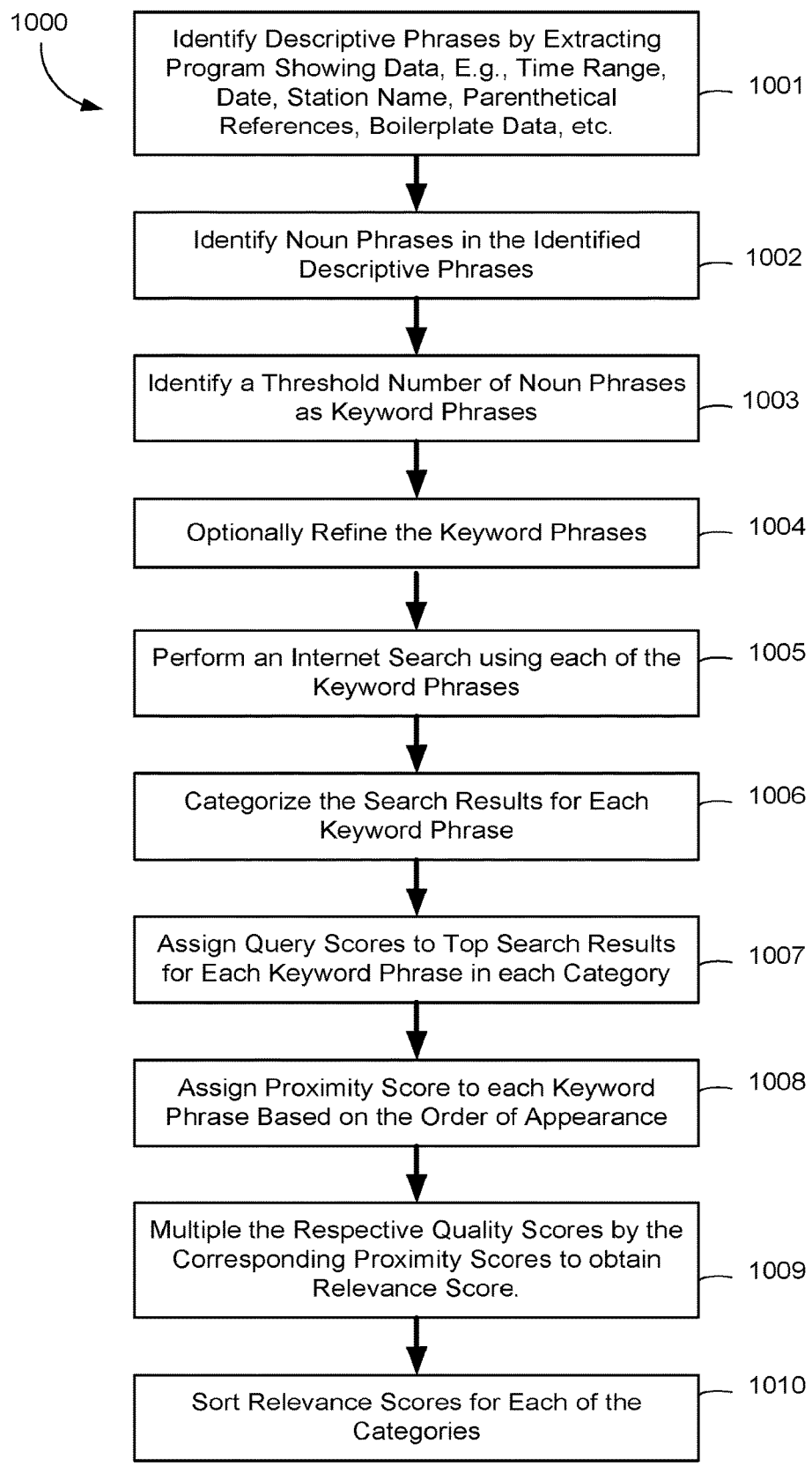
FIG. 10 is a flowchart representation of an implementation of a method of identifying and presenting Internet-accessible content associated with a currently playing television program.

FIG. 10 is a flowchart representation of an implementation of a method 1000 of identifying and presenting Internet-accessible content associated with a currently playing television program. In particular, the method 1000 is an example implementation of a method of text analysis resulting in one or more pertinent search queries. In some implementations, the method 1000 is performed by a device, such as a supplemental set-top box and/or a television integrated module, in order to enable determining what a consumer is currently watching. For example, with reference to FIGS. 6 and 8, in some implementations, the method 1000 is performed by the client device 102-1 (e.g., the supplemental set-top box). Briefly, the method 1000 parsing text included in display program data in order to identify pertinent search terms associated with a currently playing television program.

To that end, method 1000 includes identifying one or more descriptive phrases in the program information text obtained by applying an OCR process to the captured screen shot (1001). In some implementations, one or more descriptive phrases are identified by extracting program showing data from the program information text. In some implementations, program showing data includes information associated with the showing (i.e., airing) of a television program, such as for example, show time, show duration, station or channel name, parenthetical references, boilerplate data, etc. For example, using the program information text "The Price Is Right 10:00 AM-11:00 AM TV-G Contestants bid for prizes then compete for fabulous showcases," performance of the method 1000 extracts "10:00 AM-11:00 AM" as a time phrase and "TV-G" as a common phrase. And the identified descriptive phrases would include "The Price is Right" and "Contestants bid for prizes then compete for fabulous showcases."

The method 1000 includes identifying noun phrases from the identified descriptive phrases (1002). In some implementations, the process of identifying noun phrases includes comparing segments of the identified descriptive phrases to known names of television shows, movies, sporting events, as well as known actors and actresses (i.e., known proper names). Additionally and/or alternatively, in some implementations, a natural language processing toolkit is used to identify noun phrases. Continuing the example above, continued performance of the method 1000 identifies "The Price is Right", "contestants", "prizes" and "fabulous showcases" as noun phrases.

The method 1000 includes identifying a threshold number of the identified noun phrases as keyword phrases for searching (1003). For example, in some implementations the first m (e.g., m=5) noun phrases are identified as keyword phrases for searching. Optionally, the method 1000 includes refining the keyword phrases to enable more precise and/or accurate searching (1004). For example, in some implementations, the keyword phrases are checked for typographical errors that could have been introduced by the OCR process. In another example, in some implementations, the keywords are cross-referenced against known names of television shows, movies, sporting events, as well as known actors and actresses. In yet another example, in some implementations and with reference to FIGS. 6 and 8, the keyword phrases are cross-referenced against at least one of data stored in the server provided associated content heuristics cache 842 and the search results cache 843. In some implementations, the server provided associated content heuristics cache 842 includes heuristics provided by a search server system and/or media server that are associated with one or more television programs. In some implementations, the heuristics include data that has been collected from prior searches submitted by a multitude of other users and/or by the content providers to enable users to more efficiently find Internet-accessible and/or Internet-based functionality, content and/or services associated with a particular television program concurrently playing on a television or display. In some implementations, a search results cache includes data from prior search queries submitted from the client device. In some implementations, the data from prior search queries is sorted based on which queries spurred the most interest from the one or more users associated with the client device, in terms of, for example, following hyperlinks provided in search results from a particular search query.

The method 1000 includes performing an Internet search using the refined keyword phrases to obtain search results for each (1005). The method 1000 includes categorizing the search results for each keyword phrase (1006). For example, in some implementations, the search results for each keyword phrase are categorized according to a particular search result being a web page, a news story, an image, and/or a social media service link. Subsequently, the method 1000 includes assigning a query rank or score to the top X search results for each category and/or keyword phrase (1007). In some implementations, the query rank or score incorporates at least one of user location data, search history and preferences. The method 1000 then includes assigning a proximity score to each keyword phrase based on the order the keyword phrases appear the program information text (1008). In turn, the method 1000 includes multiplying each query score by a corresponding proximity score to produce a relevance score for each search result associated with a particular keyword score (1009). The method 1000 includes sorting the search results based at least on the relevance scores and displaying the search results based at least on the relevance scores (1010). In some implementations, the search results are presented based on a combination of the categories and the relevance scores. In some implementations, the search results are presented based on a combination of the keyword phrases and the relevance scores. In some implementations, the search results are presented based on a combination of the keyword phrases, the categories and the relevance scores.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A computer-implemented method, implemented at an electronic system including a display device, the method comprising:
   obtaining a media program for display on the display device;
   displaying a program information overlay concurrently with the media program on the display device, wherein the program information overlay is associated with the media program;
   while displaying the program information overlay, receiving a request for content associated with at least part of information displayed on the program information overlay; and
   in response to the request for associated content:
      capturing screen display data associated with the media program displayed on the display device;
      determining whether the program information overlay is being displayed on the display device based on an analysis of the captured screen display data to determine whether the screen display data includes one or more predefined indicators of the program information overlay;
      retrieving from a server the content associated with at least part of the information displayed on the program information overlay; and
      displaying the retrieved content on one of the display device and a second screen client device.

2. The method of claim 1, wherein processing the information displayed on the program information overlay further comprises:
   generating search terms from the information displayed on the program information overlay; and
   performing a search based on a subset of the search terms to identify the content from the server.

3. The method of claim 2, wherein the search includes a search selected from a group consisting of a general Internet search, a targeted search for associated news items, a targeted search for associated images, a targeted search for associated Internet-accessible media content, and a targeted search for associated social media content.

4. The method of claim 1, wherein receiving the request for associated content further comprising receiving a user press on one of:
   a button of a remote control coupled to the display device; and
   an affordance on an application interface configured to control play of the media program on the display device.

5. The method of claim 1, wherein the retrieved content includes one or more of: a program title, actor names, character names, and plot summaries.

6. The method of claim 1, wherein the retrieved content includes one or more of: a content file, a link to the content file, and metadata associated with the content file.

7. The method of claim 1, wherein the retrieved content includes one or more of videos, images, music, web pages, email messages, SMS messages, content feeds, playlists, XML documents, and ratings associated with media content.

8. The method of claim 1, wherein the retrieved content includes one or more of links to videos, images, music, web pages, email messages, SMS messages, content feeds, playlists, XML documents, and ratings associated with media content.

9. The method of claim 1, wherein the retrieved content is displayed on the one of the display device and second screen client device, concurrently and synchronously with displaying the media program and program information overlay.

10. The method of claim 1, wherein the one or more predefined indicators include at least one of: a color of the program information overlay, a percentage of display area the program information overlay typically covers when visible, an arrangement of text with the program information overlay, contrast between a portion of a display likely to be displaying the media program and another portion of the display likely to be displaying the program information overlay.

11. The method of claim 1, wherein the server includes one or more third party content servers, and the content is stored in a database of the server, and wherein the database is established at least partially based on heuristic data of prior searches of a plurality of users and content providers.

12. An electronic system, comprising:
   a display device;
   one or more processors; and
   memory storing one or more programs, the one or more programs including instructions that, when executed by the one or more processors, cause the device to implement operations for:
      obtaining a media program for display on the display device;
      displaying a program information overlay concurrently with the media program on the display device, wherein the program information overlay is associated with the media program;
      while displaying the program information overlay, receiving a request for content associated with at least part of information displayed on the program information overlay; and
      in response to the request for associated content:
         capturing screen display data associated with the media program displayed on the display device;
         determining whether the program information overlay is being displayed on the display device based on an analysis of the captured screen display data to determine whether the screen display data includes one or more predefined indicators of the program information overlay;
         retrieving from a server the content associated with at least part of the information displayed on the program information overlay; and
         displaying the retrieved content on one of the display device and a second screen client device.

13. The electronic system of claim 12, wherein processing the information displayed on the program information overlay further comprises:
   identifying noun phrases in the information displayed on the program information overlay; and
   selecting a threshold number of noun phrases to be search terms to retrieve the content from the server.

14. The electronic system of claim 13, wherein retrieving the content from the server further comprises:
   performing a respective search for each of the threshold number of noun phrases, and wherein each respective search produces a subset of the retrieved content.

15. The electronic system of claim 12, wherein processing the information displayed on the program information overlay further comprises:
- cross-referencing noun phrases in the information displayed on the program information overlay against prior search data.

16. A non-transitory computer readable storage medium storing one or more programs, the one or more programs including instructions that, when executed by one or more processors of an electronic system cause the processors to implement operations for:
- obtaining a media program for display on a display device of the electronic system;
- displaying a program information overlay concurrently with the media program on the display device, wherein the program information overlay is associated with the media program;
- while displaying the program information overlay, receiving a request for content associated with at least part of information displayed on the program information overlay;
- in response to the request for associated content:
  - capturing screen display data associated with the media program displayed on the display device;
  - determining whether the program information overlay is being displayed on the display device based on an analysis of the captured screen display data to determine whether the screen display data includes one or more predefined indicators of the program information overlay;
  - retrieving from a server the content associated with at least part of the information displayed on the program information overlay; and
  - displaying the retrieved content on one of the display device and a second screen client device.

17. The non-transitory computer readable storage medium of claim 16, wherein retrieving the content from the server further comprises:
- performing a search at the server to identify a plurality of search results;
- scoring the search results; and
- enabling display of at least some of the search results as the retrieved content based on the scoring.

18. The non-transitory computer readable storage medium of claim 17, wherein scoring the search results comprises:
- categorizing the search results; and
- for each search result, assigning a query score based on at least one of location data, search history and user preferences, wherein each result of the search is displayed based at least on the query score.

19. The non-transitory computer readable storage medium of claim 16, wherein processing the information displayed on the program information overlay further comprises:
- cross-referencing noun phrases in the information displayed on the program information overlay against known names of television shows, movies, sporting events and known proper names.

* * * * *